(12) United States Patent
Zuniga et al.

(10) Patent No.: US 8,675,622 B2
(45) Date of Patent: *Mar. 18, 2014

(54) SELF-CONFIGURABLE WIRELESS LOCAL AREA NETWORK NODE

(75) Inventors: Juan Carlos Zuniga, Montreal (CA); Marian Rudolf, Montreal (CA); Shamim Akbar Rahman, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/563,378

(22) Filed: Sep. 21, 2009

(65) Prior Publication Data

US 2010/0008344 A1 Jan. 14, 2010

Related U.S. Application Data

(63) Continuation of application No. 11/321,393, filed on Dec. 29, 2005, now Pat. No. 7,613,119.

(60) Provisional application No. 60/670,174, filed on Apr. 11, 2005.

(51) Int. Cl.
*H04Q 7/24* (2006.01)
(52) U.S. Cl.
USPC ............ 370/338; 370/328; 370/331; 370/350
(58) Field of Classification Search
USPC .................................. 370/338, 339, 310, 328
See application file for complete search history.

(56) References Cited

U.S. PATENT DOCUMENTS

| 6,041,228 | A | 3/2000 | Niska et al. | |
|---|---|---|---|---|
| 7,173,922 | B2 | 2/2007 | Beach | |
| 7,224,677 | B2 * | 5/2007 | Krishnamurthi et al. | 370/331 |
| 7,231,224 | B1 * | 6/2007 | Chesson | 455/523 |
| 7,840,228 | B2 * | 11/2010 | Suemitsu et al. | 455/502 |
| 2002/0081971 | A1 | 6/2002 | Travostino | |
| 2002/0114303 | A1 * | 8/2002 | Crosbie et al. | 370/338 |
| 2002/0157090 | A1 * | 10/2002 | Anton, Jr. | 717/178 |
| 2003/0027552 | A1 | 2/2003 | Kouznetsov | |
| 2003/0162553 | A1 | 8/2003 | Huang et al. | |
| 2003/0174666 | A1 * | 9/2003 | Wallace et al. | 370/324 |

(Continued)

OTHER PUBLICATIONS

L. Yang et al, "Architecture Taxonomy for Control and Provisioning of Wireless Access Points (CAPWAP)," Jul. 28, 2004, Internet Draft, Expires Jan. 26, 2005, Copyright—The Internet Society (2004).

(Continued)

*Primary Examiner* — Dai A Phuong
(74) *Attorney, Agent, or Firm* — Volpe and Koenig, P.C.

(57) ABSTRACT

In a wireless local area network including an access controller (AC) and an access points (AP), the AC transmits a functionality inquiry to the AP. Upon receiving the inquiry, the AP transmits a query response including the functional capabilities of the AP. The AC then generates a map of the functional capabilities present in the network based on the inquiry response. Conflicting or redundant functional capabilities are identified and are disabled, enabled, or reconfigured by instructions from the AC. The AC may selectively enable and/or disable functional capabilities at nodes in the network to provide a more balanced load on the network, and to provide for load sharing by allocating functionalities between and among network nodes having common functional capabilities to satisfy a variety of situations encountered in the network.

14 Claims, 6 Drawing Sheets

(56) References Cited

U.S. PATENT DOCUMENTS

| | | | |
|---|---|---|---|
| 2004/0143681 | A1 | 7/2004 | Benveniste |
| 2004/0146041 | A1* | 7/2004 | Lee et al. ............... 370/349 |
| 2004/0252696 | A1* | 12/2004 | Kakishima et al. ........ 370/395.2 |
| 2005/0059396 | A1 | 3/2005 | Chuah et al. |
| 2005/0101245 | A1* | 5/2005 | Ahmavaara ............... 455/1 |
| 2005/0122929 | A1 | 6/2005 | Zuniga |
| 2005/0128959 | A1* | 6/2005 | Yamada et al. ............... 370/254 |
| 2005/0208944 | A1* | 9/2005 | Okita et al. ............... 455/436 |
| 2005/0233734 | A1* | 10/2005 | Rajkotia et al. ............ 455/414.1 |
| 2006/0039334 | A1* | 2/2006 | Koga ............... 370/338 |
| 2006/0098616 | A1* | 5/2006 | Kish et al. ............... 370/338 |
| 2006/0217072 | A1* | 9/2006 | Poyhonen et al. ......... 455/67.11 |
| 2007/0258414 | A1 | 11/2007 | Cheng et al. |
| 2009/0093243 | A1* | 4/2009 | Lee et al. ............... 455/418 |
| 2010/0268823 | A1* | 10/2010 | Torarp et al. ............... 709/225 |
| 2011/0314147 | A1* | 12/2011 | Whelan et al. ............... 709/224 |

OTHER PUBLICATIONS

IEEE 802.11 Working Group of the LAN/MAN Committee, Institute of Electrical and Electronics Engineers, "Draft Amendment to Standard for Information Technology—Telecommunications and Information Exchange Between Systems—LAN/MAN Specific Requirements—Part 11: Wireless Medium Access Control (MAC) and Physical Layer (PHY) Specifications: Amendment: ESS Mesh Networking," IEEE P 802.11s/D 0.01, Mar. 2006.

IEEE 802.15 Working Group for Wireless Personal Area Networks (WPANs), Institute of Electrical and Electronics Engineers, "Preliminary Draft of Baseline Document for 802.15.5 Mesh Networking," IEEE 802.15.5, Sep. 22, 2005.

IEEE LAN/MAN Standards Committee of the IEEE Computer Society and the IEEE Microwave Theory and Techniques Society, Institute of Electrical and Electronics Engineers, "IEEE Standard for Local and Metropolitan Area Networks, Part 16: Air Interface for Fixed Broadband Wireless Access Systems," IEEE Std. 802.16, Oct. 1, 2004.

IEEE LAN/MAN Standards Committee of the IEEE Computer Society, Institute of Electrical and Electronics Engineers, "Draft IEEE Standard for Local and Metropolitan Area Networks: Media Independent Handover Services," IEEE P 802.21/D 00.03, Oct. 2006.

* cited by examiner

SELF-CONFIGURABLE WIRELESS LOCAL AREA NETWORK NODE

CROSS REFERENCE TO RELATED APPLICATIONS

This application is a continuation of U.S. patent application Ser. No. 11/321,393, filed Dec. 29, 2005, which claims the benefit of U.S. Provisional Patent Application No. 60/670,174, filed on Apr. 11, 2005, which is incorporated by reference as if fully set forth herein.

FIELD OF INVENTION

The present invention generally relates to wireless local area networks (WLANs), and more particularly, to a method and apparatus for determining and analyzing network topology, configuring network nodes, and resolving functional conflicts that arise in network architectures.

BACKGROUND

The term "access point" (AP) as used herein includes, but is not limited to, a base station, an access router (AR), a Node B, a site controller, or other interfacing device in a wireless environment that provides other stations with wireless access to a network with which the AP is associated.

The term "station" (STA) as used herein includes, but is not limited to, a wireless transmit/receive unit (WTRU), a user equipment, a mobile station, a fixed or mobile subscriber unit, a pager, or any other type of device capable of operating in a wireless environment.

Typically, a WLAN includes a plurality of APs, wherein each AP is capable of conducting concurrent wireless communications with appropriately configured STAs, as well as multiple appropriately configured APs or ARs, when configured in the "infrastructure mode". Some STAs may alternatively be configured to conduct wireless communications directly to one another, i.e., without being relayed through a network via an AP. This is commonly known as "peer-to-peer mode" or "ad hoc mode". Where a STA is configured to communicate directly with other STAs, it may also be configured to function as an AP. STAs can be configured for use in multiple networks, with both network and peer-to-peer communications capabilities.

In the infrastructure mode architecture, STAs are conventionally connected in a star-type topology to a central AP in order to communicate to each other or to connect to other external networks. Although this architecture has proven successful in the past, many factors, such as the increasing number of closely located APs, the increasing number of applications for a WLAN, and the fact that APs are restricted to public bands, have resulted in conventional infrastructure mode architectures becoming less desirable. Accordingly, other infrastructure mode topologies have evolved.

One topology is known as a "mesh" topology, in which WLAN nodes have two or more paths between them which enables the nodes to communicate directly with each other (i.e., as in the ad hoc mode) and to communicate indirectly with each other (via other nodes that relay information). A second topology is known as a "split" architecture, in which one or more access routers (ARs) or access controllers (ACs) are connected via an interconnection to APs present in the network. The ACs provide network-wide monitoring, improve scalability, and facilitate dynamic configurability. The logical interconnection may be a direct connection to the APs, a switched connection, or a routed network connection. The AC and the AP may be collocated in the same physical device.

In addition to exchanging configuration and control information with the APs, the ACs "split" or share certain functionalities with the APs that are conventionally provided solely by the APs. That is, functions typically provided by standalone or "fat" APs are removed from these APs and are provided by the AC(s). These split-function or reduced-function APs are referred to as "thin" APs. This architecture is similar to a UMTS architecture, where the AC is analogous to a central radio network controller (RNC) and the AP is analogous to a Node B connected to the RNC.

FIG. 1 is a diagram of a network 100 with an infrastructure mode architecture including a plurality of STAs 102a-102n communicating with a fat AP 104. This architecture is often referred to as a fat AP architecture because all of the medium access control (MAC) layer functionalities are located in the AP 104. The STAs 102 communicate with the AP 104, and with one another via the AP 104. The AP 104 incorporates a physical (PHY) layer 106, a real time (RT) MAC layer 108, and a non-real time (NRT) MAC layer 110.

FIG. 2 is a diagram of a network 200 with a split architecture, including a plurality of STAs 202a-202i, several APs 204a-204c, and an access controller (AC) 206. In the split network 200, certain AP functions are split away from the APs 204 and are provided by the AC 206. Although the AP functions may be split in any number of configurations, FIG. 2 shows one of the most common arrangements. The APs 204 terminate the infrastructure side of the wireless physical links, provide radio-related management, and provide all RT services to the STAs 202. The AC 206 provides the NRT management functions such as configuration, quality of service (QoS), access control, etc., for all of the APs 204. By sharing functionalities at a higher layer, a better coordinated deployment is possible.

The AP functional definitions made to support future AC-AP architectures must also be backward compatible to accommodate present-day devices. Since infrastructure mode networks are the present-day convention, it is noted that accommodating hybrid architectures, i.e., those networks with both fat APs and thin APs, will be a significant challenge for future networks.

An example of a pathological hybrid network 300 with both fat APs and thin APs is shown in FIG. 3. The network 300 includes a plurality of STAs 302a-302i; two thin APs, AP1 (304a) and AP2 (304b); a fat AP, AP3 (306); and an AC 308. AP3 306 provides all of its L2 MAC functionalities, including both the RT MAC 310 and the NRT MAC 312. In this deployment, the AC 308 manages all three APs 304a, 304b, 306. Accordingly, there is a conflict with redundancy in the NRT functionalities between the AC (NRT MAC 314) and AP3 306 (NRT MAC 312). This conflict is further aggravated in other network topologies such as, for example, mesh networks, wherein AP functionalities are distributed over the entire mesh network and wherein direct communication between ACs and APs is not always possible.

Accordingly, it is desirable to provide a method and apparatus to resolve functional conflicts that arise in WLAN architectures.

SUMMARY

The present invention relates to a method and apparatus for configuring network nodes and resolving functional conflicts or redundancies that arise in network architectures. In a WLAN including at least one AC and a plurality of APs, the AC transmits functionality queries to the APs. Upon receiving these queries, the APs transmit query responses, which include the functional capabilities of the APs. The AC then generates a functional map of the functional capabilities available in the network based on the query responses. Conflicting or redundant functional capabilities are identified and are disabled, enabled, or reconfigured by instructions from the AC to the APs having conflicting or redundant functionalities.

A method for configuring nodes in a WLAN including an AC and an AP begins with the AC sending a functionality inquiry to the AP. The AP responds to the functionality inquiry by sending its functional capabilities to the AC. The AC maps the functional capabilities of the AP. A determination is made whether a capability conflict exists between the capabilities of the AP and the capabilities of the AC, wherein a conflict can include redundant capabilities between the AP and the AC. If there are any capability conflicts, they are resolved.

An AC for configuring nodes in a WLAN includes a transmitter/receiver, an inquiry device, a capability mapping device, and a capability evaluating device. The inquiry device is in communication with the transmitter/receiver and is configured to send functionality inquiry messages to an AP in the WLAN. The capability mapping device is in communication with the transmitter/receiver and is configured to receive functionality inquiry reply messages from the AP and to map the functionality capabilities of the AP. The capability evaluating device is in communication with the capability mapping device and is configured to determine if any functionality capability conflicts exist between the AP and the AC.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Figure 1:
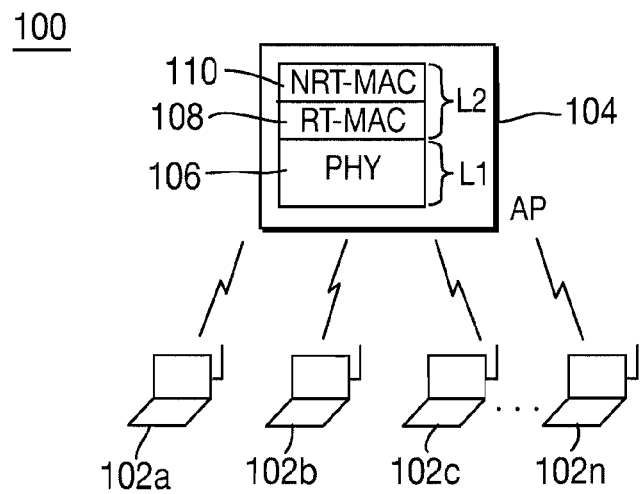
FIG. 1 is a diagram of an infrastructure mode WLAN with a fat AP.
Figure 2:
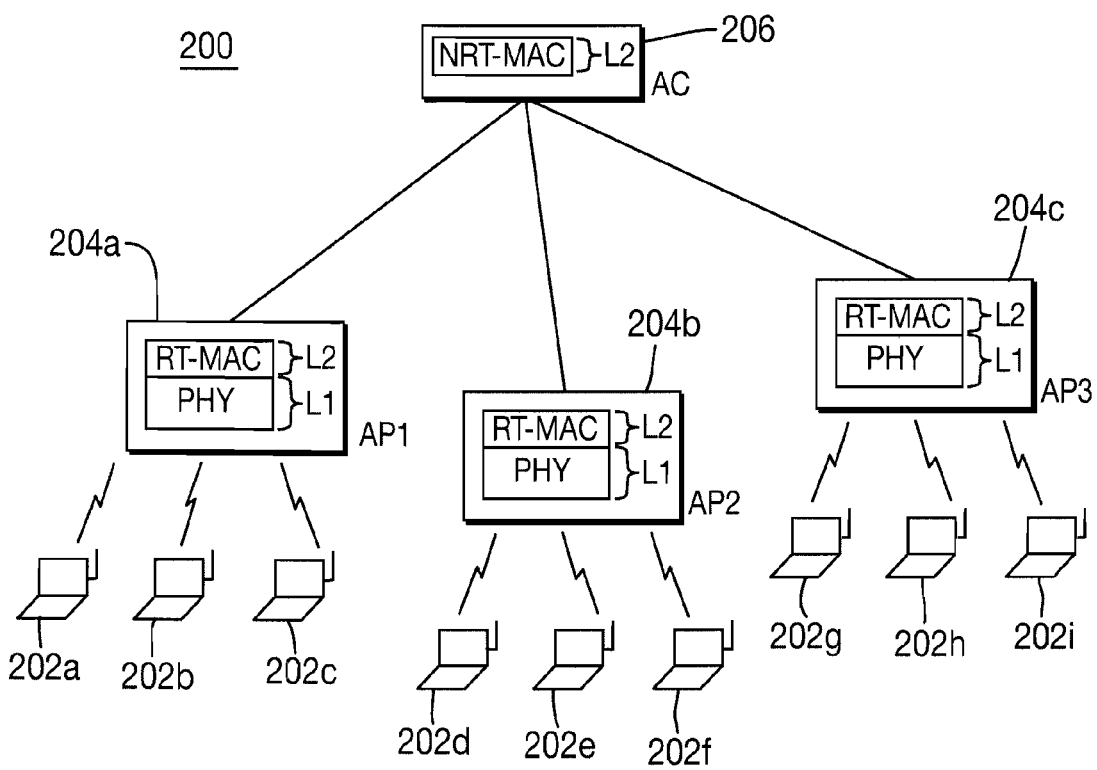
FIG. 2 is a diagram of a split architecture WLAN with thin APs.
Figure 3:
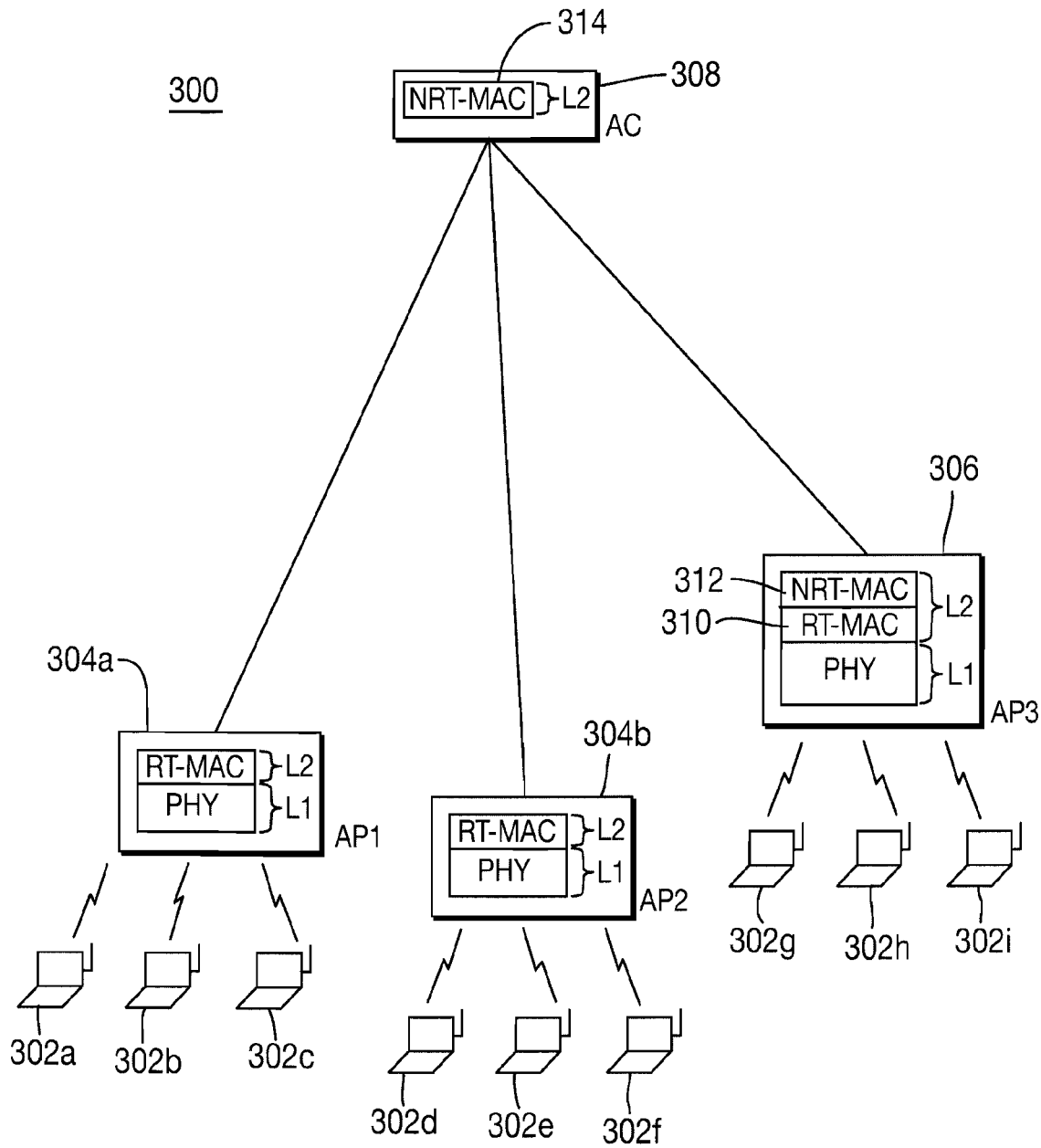
FIG. 3 is a diagram of a hybrid WLAN architecture with both fat APs and thin APs.

In a preferred embodiment, a WLAN including at least one AC and at least one AP is considered. The AC is preferably configured to split or remove certain L2 MAC functionalities (e.g., NRT MAC functions) from the AP(s) and provide these functionalities to the network. An example of this configuration is shown in FIG. 3. Alternatively, the AC may provide all MAC layer functionalities to the network. As noted above, the AC may split and provide any functionality that is typically provided by the APs, including MAC layer functions, PHY layer functions, security methods, management interfaces, etc.

The present invention is not limited to the network deployment illustrated in FIG. 3. Rather, the present invention is applicable to any network deployment in which functional conflicts between network components occur. As previously described in connection with FIG. 3, there is a redundancy conflict with the NRT functionalities between the AC 308 and AP3 306, in that both the AC 308 and AP3 306 attempt to provide L2 NRT-MAC functionalities, creating a problem in the network 300.

Overview

Utilizing a query-response mechanism, the AC queries all associated APs regarding their respective functional capabilities. Once responses are received from all associated APs, the AC utilizes the responses to generate a functional map of the different functional blocks available in the network. This functional map enables the AC to detect whether any APs are providing duplicate functionalities that may cause an operational conflict.

If an AP in the system fails to respond or is unable to respond to the AC's query, the AC may assume that the non-responding AP is capable of implementing all functionality modules and that a resulting functionality conflict exists. Failure to respond to the AC's query may indicate one of two possible scenarios: that an AP was implemented according to an alternate standard or that the AP is a legacy AP not capable of responding to the query. Since the AP will be assumed to be a fat AP capable of providing all possible functionalities, the AC stops support of the non-responding AP.

To resolve a detected conflict or redundancy, the AC generates and transmits a message to the AP ordering that the conflicting module in the AP be disabled or reconfigured to resolve the redundancy. Conflicts among network modules are preferably resolved based on the individual priority of the modules. Modules that reside higher in the network hierarchy (i.e., AC) are given higher priority than nodes that are lower in the hierarchy (i.e., APs). Disabling a module in the AP preferably occurs after a predetermined period of time (e.g., sync-up, future event, etc.), at which point the AC takes control of those functions for the AP and thus resolves the conflict.

It should be noted that the messaging means described above may also be used to enable functionalities, such as with a functionality enabling message. Additionally, the disabling, reconfiguring, and enabling of functionalities may occur during a system start-up phase or dynamically while the system is operating. Dynamic adjustments may be utilized, for example, to better distribute and re-balance processing power in a system based on functional maps and node priority. Similarly, dynamically adjusting functions may be preferred in certain architectures, such as mesh networks, wherein the AC functionalities are not situated in a single network node, but are distributed across various nodes.

It is noted that an AC may split and/or provide some or all MAC layer functions, while allowing the APs to provide some or all PHY layer or multiple PHY layer functions. Further, the approach described herein may be applied to other functionalities such as to multiple PHY layers, multiple radios (RFs), multiple security methods, multiple routing algorithms, different versions of a standard (e.g., 802.11e-WMS/WME/other), management interfaces (e.g., station management entity (SME)), etc., wherein the AC splits and provides these functions.

AR-AP Capability Signaling

Figure 4A:
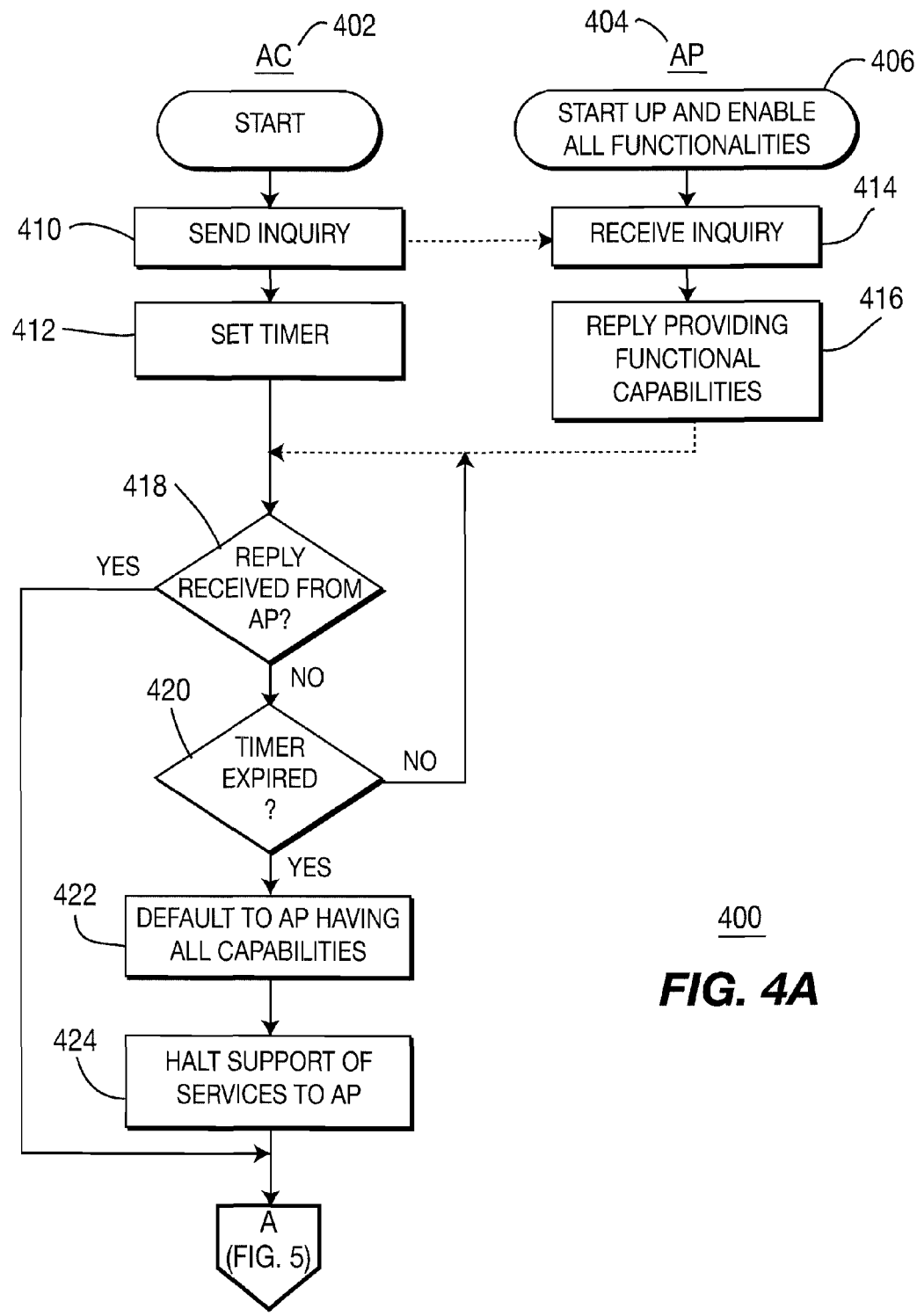
FIGS. 4A, 4B, and 5 are flow diagrams of a method for resolving functionality conflicts or redundancies between an AC and an AP in the architecture shown in FIG. 3.
Figure 4B:
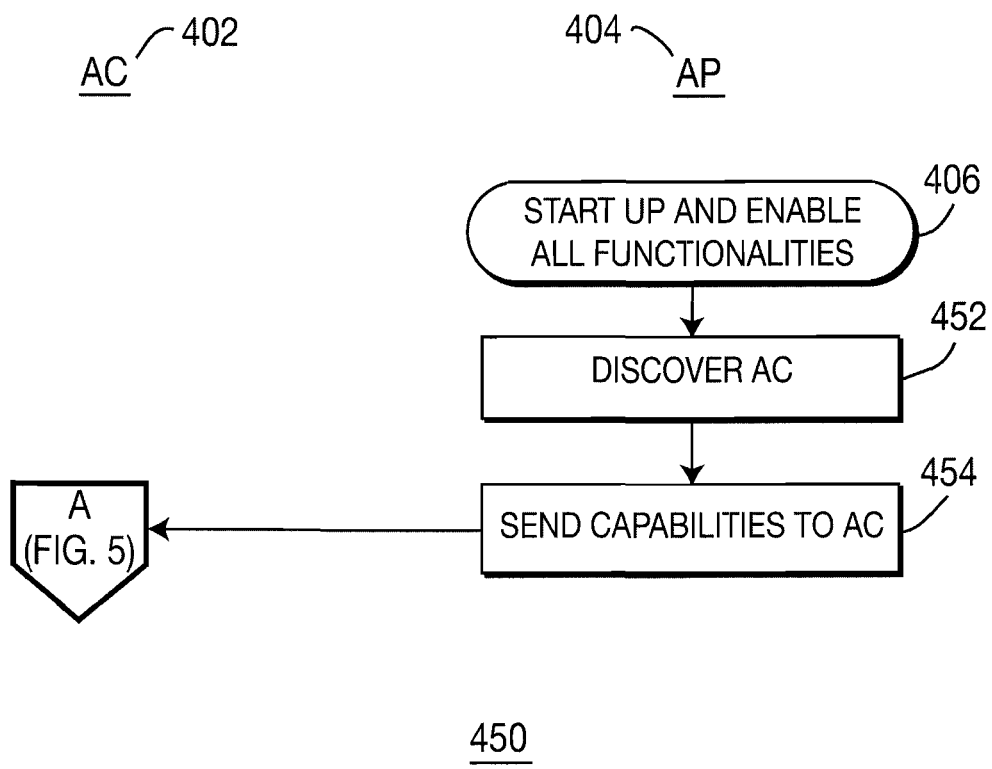
Figure 5:
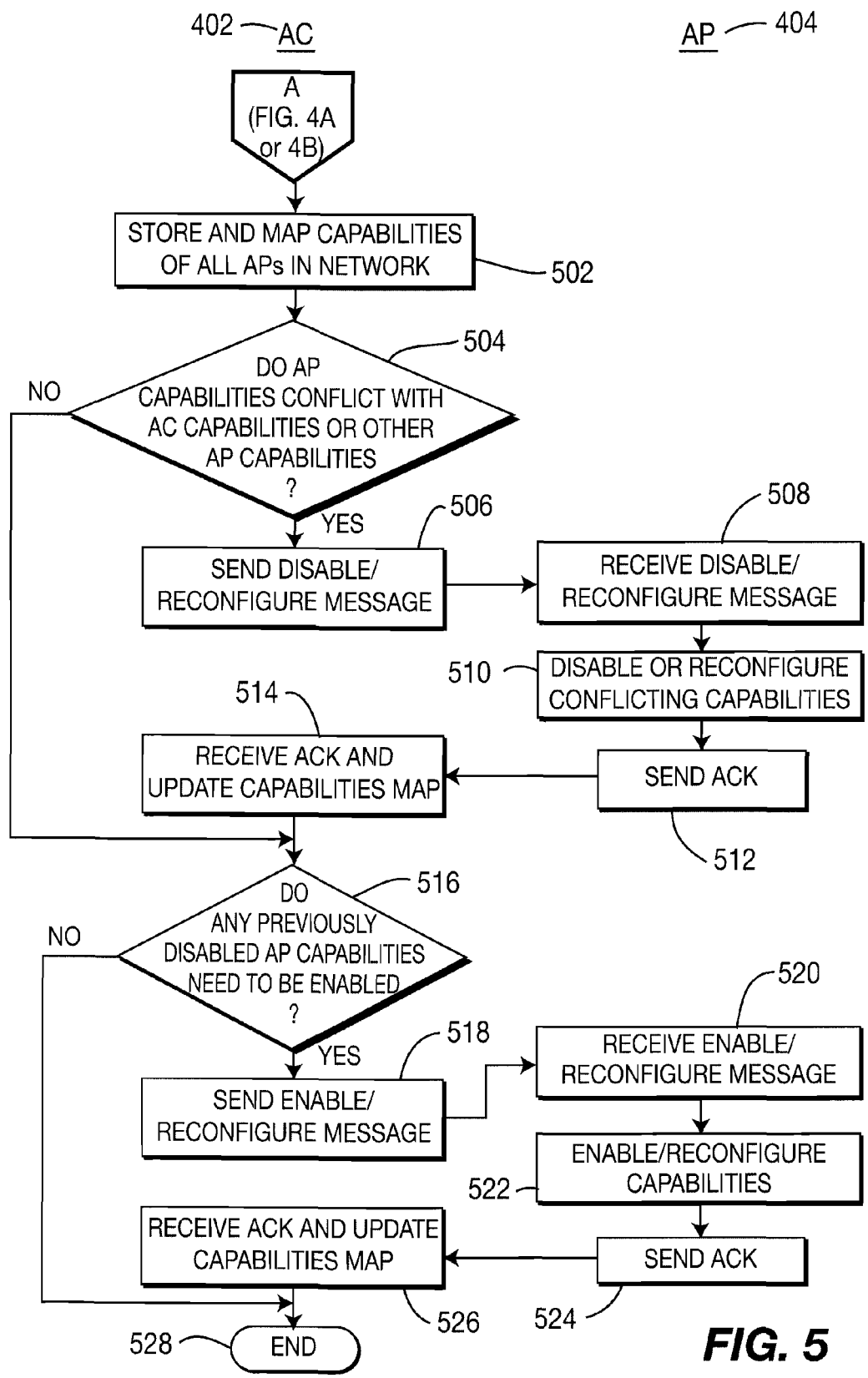

FIGS. 4A, 4B, and 5 are flow diagrams of a method 400 for resolving functionality conflicts between an AC 402 and an AP 404. Although the network is typically provided with a plurality of APs, only one AP 404 and its interaction with the AC 402 is shown for purposes of simplicity, it being understood that the AC 402 interrogates all other APs in the network in a like manner. As an initial step, the AP 404 starts up and enables all of its functionalities (step 406).

The AC 402 sends an inquiry to the AP 404 (step 410). The inquiry can be sent upon initial setup or upon the entry of a new node to the network, such that the system can correctly configure itself as quickly as possible. The inquiry can also be sent on a periodic basis (e.g., once a day as the system should not need to change too frequently) or by being triggered by a particular event (e.g., when a congestion condition arises, the capabilities are gathered as a pretext for load balancing). After the inquiry is sent, the AC 402 sets a timer for receiving a reply from the AP 404 (step 412). The AP 404 receives the inquiry (step 414) and replies to the AC 402 providing its functional capabilities (step 416).

There is a possibility that the AC 402 may send an inquiry to the AP 404 (step 410) and the AP 404 fails to respond, as indicated by the dashed lines for sending the inquiry and sending the reply. Failure to respond to the AC's query may indicate that an AP was implemented according to an alternate standard or that the AP is a legacy AP not capable of responding to the query.

After the timer has been set (step 412), a determination is made whether the AC 402 has received a reply from the AP 404 (step 418). If no reply has been received, then a check is made to determine whether the timer has expired (step 420). If the timer has not expired, the method 400 waits for a reply from the AP 404 (step 418).

If the timer has expired (step 420), this indicates that no reply was received from the AP 404. The AC 402 defaults the AP 404 to having all possible capabilities (step 422). Since the AP 404 is presumed to have all possible capabilities (e.g., that the AP 404 is a fat AP), the AC 402 also halts support of services to the AP 404 (step 424). As applied to the scenario shown in FIG. 3, the AC 402 will not attempt to perform NRT-MAC scheduling for the AP 404 because the AP 404 is presumed to have this capability.

FIG. 4B is a flowchart of an alternate method 450 for performing the initial steps of the method 400. The AP 404 starts up and enables all of its functionalities (step 406). The AP 404 attempts to discover the AC 402 (step 452). The AP 404 can attempt to discover the AC 402 through various means. For example, the AC 402 could broadcast packets announcing its presence or a dedicated pre-agreed address on how to join the AC 402 could be known to all APs. After the AP 404 has discovered the AC 402, the AP 404 sends its capabilities to the AC 402 (step 454).

If the AC 402 has received a reply from the AP 404 (step 418), if the AC 402 has set the AP 404 to having default capabilities (steps 422, 424), or if the AP 404 has sent its capabilities to the AC 402 (step 454), the AC 402 stores and maps the capabilities of all APs in the network (step 502; FIG. 5). Next, the AC 402 determines whether the capabilities of any AP conflict or are redundant with the capabilities of the AC 402 or with the capabilities of another AP (step 504). The capabilities of other APs are checked for situations where there are different levels of APs or where APs have different priorities within the network.

As one example, assume that the AP 404 has a plurality of functional capabilities, at least one of which is the same as at least one of the capabilities of the AC 402. In order to avoid any conflict within the network, the co-existence of the common function by both the AC 402 and the AP 404 necessitates that this co-existence be resolved by preventing the AP 404 from providing this functionality to other nodes within the network. The AC 402 may utilize an associative memory technique for comparing the AC functionalities with the AP functionalities. However, any other suitable technique for determining a conflict may be employed.

If there are any capability conflicts or redundancies (step 504), then the AC 402 sends a disable or reconfigure capabilities message to the AP 404 (step 506). In instances where an AP may have priority over another AP or other APs in the network, the AP having priority is permitted to support the functionality in issue and lower priority APs will have the functionality disabled or reconfigured. In situations where none of the APs have a higher priority level but are located at a higher level in the network architecture hierarchy, only the AP having the higher network hierarchy level is instructed to continue support of that functionality. In either case, the AC provides disabling or reconfiguring messages to APs at a lower network hierarchy level.

Additional factors considered by the AC include functional capabilities derived from cross-vendor components in which conflicts or redundancies arise due to differences in the components or due to one of the APs having superior operational capabilities compared with other APs in the network. This situation may arise where functional capabilities are shared in common with two APs, wherein one of which is a legacy AP, and the AC decides in favor of the more up to date module while disabling or reconfiguring the functional capability of the legacy AP.

The AP 404 receives the disable or reconfigure capabilities message (step 508) and disables or reconfigures any capabilities that conflict or are redundant with the AC's capabilities (step 510). After adjusting the capabilities according to the message, the AP 404 sends an acknowledgement (ACK) to the AC 402 (step 512). The AC 402 receives the ACK and updates the capabilities map with the current capabilities of the AP 404 (step 514).

The allocation of capabilities between and among the APs is not limited to MAC layer functions and PHY layer functions and may include security methods, management interfaces, and the like. For example, in mesh networks, the AC can allocate and split functional capabilities over the network in order to provide better balance within the network and to alleviate potential overloading of network nodes. Alternatively, security requirements may be utilized as the overriding factor in allocating and assigning functional capabilities between and among the APs.

If there are no conflicting capabilities or redundancies (step 504) or after the AC 402 has received the ACK and updated the capabilities map based on disabled or reconfigured capabilities (step 514), a determination is made whether any previously disabled capabilities of the AP 404 need to be enabled (step 516). This scenario may arise, for example, in a load balancing situation where the AC 402 wants to enable or reconfigure functions in the AP 404 that it had previously disabled or reconfigured.

If there are any capabilities that need to be enabled or reconfigured (step 516), then the AC 402 sends an enable/reconfigure message to the AP 404 (step 518). The AP 404 receives the enable/reconfigure message (step 520) and enables or reconfigures the capabilities listed in the message (step 522). After enabling or reconfiguring the capabilities according to the message, the AP 404 sends an ACK to the AC 402 (step 524). The AC 402 receives the ACK and updates the capabilities map with the current capabilities of the AP 404 (step 526) and the method terminates (step 528).

If there are no capabilities that need to be enabled or reconfigured (step 516), then the method terminates (step 528).

Exemplary System

Figure 6:
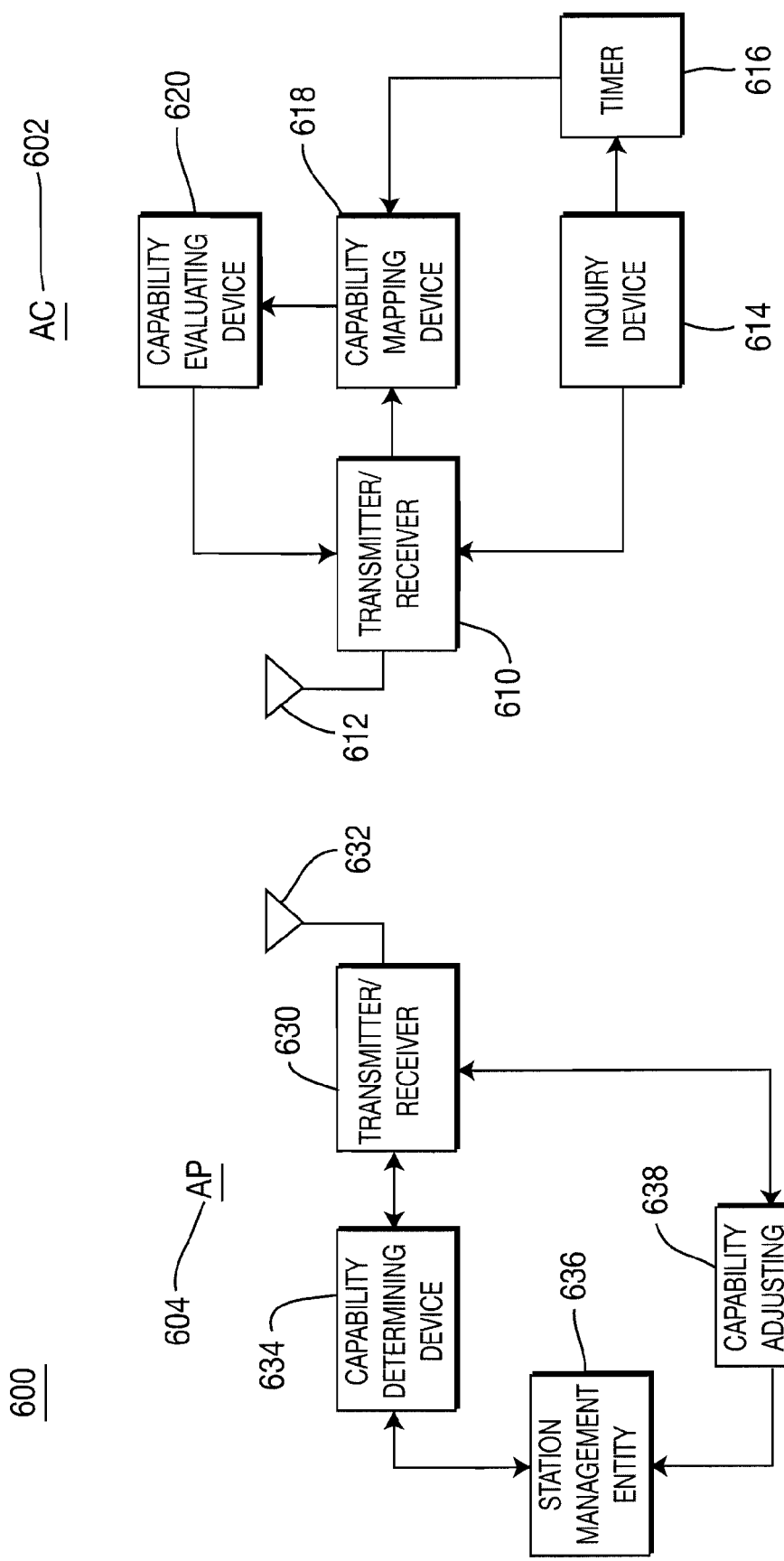
FIG. 6 is a block diagram of a system including an AC and an AP configured to perform the method shown in FIGS. 4A, 4B, and 5.

FIG. 6 is a block diagram of a system 600 including an AC 602 and an AP 604 configured to perform the method 400.

The AC 602 includes a transmitter/receiver 610, an antenna 612 connected to the transmitter/receiver 610, an inquiry device 614 in communication with the transmitter/receiver 610, a timer 616 in communication with the inquiry device 614, a capability mapping device 618 in communication with the transmitter/receiver 610 and the timer 616, and a capability evaluating device 620 in communication with the capability mapping device 618 and the transmitter/receiver 610.

The AP includes a transmitter/receiver 630; an antenna 632 connected to the transmitter/receiver 630; a capability determining device 634 in communication with the transmitter/receiver 630; a station management entity (SME) 636 in communication with the capability determining device 634, the SME 636 including a list of the capabilities of the AP 604; and a capability adjusting device 638 in communication with the transmitter/receiver 630 and the SME 636.

In operation, the system 600 functions as follows. The inquiry device 614 sends an inquiry message to the transmitter/receiver 610 for transmission to the AP 604. When the inquiry message is sent, the inquiry device 614 sets the timer 616. The AP 604 receives the inquiry message via its transmitter/receiver 630. The inquiry message is passed to the capability determining device 634, which accesses the capabilities list in the SME 636 to determine the capabilities of the AP 604. The capability determining device 634 then sends a reply message to the transmitter/receiver 630 for transmission to the AC 602.

The reply message is received at the AC 602 and is passed to the capability mapping device 618, which maps the capabilities of all APs in communication with the AC 602. If the AC 602 does not receive a reply from the AP 604 and the timer 616 expires, and the capability mapping device 618 defaults the AP 604 to having all possible capabilities (i.e., the AP 604 will be considered to be a fat AP).

The capability evaluating device 620 examines the capability mapping for all APs and determines which APs have capabilities that conflict with the AC 602. If there are any conflicting capabilities, the capability evaluating device 620 sends a disable or reconfigure message to the transmitter/receiver 610 for transmission to the AP 604. Upon receipt of the disable or reconfigure message by the AP 604, it is forwarded to the capability adjusting device 638 which disables or reconfigures the capabilities specified by the message by signaling the SME 636 which updates the capabilities list accordingly. Once the capabilities are disabled or reconfigured, the capability adjusting device 638 sends an ACK to the AC 602.

In a similar manner, if the AC 602 instructs the AP 604 to enable or reconfigure any capabilities, the capability adjusting device 638 enables or reconfigures the capabilities specified by the AC 602 by signaling the SME 636 which updates the capabilities list accordingly. Once the capabilities are enabled or reconfigured, the capability adjusting device 638 sends an ACK to the AC 602.

Although the features and elements of the present invention are described in the preferred embodiments in particular combinations, each feature or element can be used alone without the other features and elements of the preferred embodiments or in various combinations with or without other features and elements of the present invention. Although the various embodiments discussed above are described with reference to certain layers, it should be understood that any of the embodiments can be implemented in any layer or any combination of layers. Further, the features and elements of the present invention may be implemented on a single integrated circuit, such as an application specific integrated circuit (ASIC), multiple ICs, discrete components, or a combination of discrete components and ICs. Moreover, the present invention may be implemented in any type of wireless communication system.

What is claimed is:

1. A method for adjusting the functional capabilities of an access point (AP), comprising:
communicating the functional capabilities of the AP to an access controller (AC);
receiving a capability adjustment message from the AC, the capability adjustment message based on a capability conflict resolution between the AP and the AC;
adjusting the functional capabilities of the AP based on the capability adjustment message, wherein the functional capabilities include media access control layer functionalities; and
sending an acknowledgement once the adjusting is complete.

2. The method according to claim 1, wherein
the capability adjustment message is a disable capabilities message; and
the adjusting includes disabling functional capabilities of the AP based on the disable capabilities message.

3. The method according to claim 1, wherein
the capability adjustment message is an enable capabilities message; and
the adjusting includes enabling functional capabilities of the AP based on the enable capabilities message.

4. The method according to claim 1, wherein
the capability adjustment message is a reconfigure capabilities message; and
the adjusting includes reconfiguring functional capabilities of the AP based on the reconfigure capabilities message.

5. The method according to claim 1, further comprising:
receiving a functional capability inquiry message; and
generating a response to the functional capability inquiry message, the response including the list of the functional capabilities of the AP.

6. The method according to claim 1, wherein the communicating includes:
receiving a functional capability inquiry from the AC; and
replying to the functional capability inquiry, providing functional capabilities of the AP.

7. The method according to claim 1, wherein the communicating includes:
discovering the AC; and
sending a functional capabilities indication to the AC.

8. An access point (AP), comprising:
a transmitter/receiver configured to:
communicate the functional capabilities of the AP to an access controller (AC); and
receive a capability adjustment message from the AC, the capability adjustment message based on a capability conflict resolution between the AP and the AC;
a capability determining device in communication with the transmitter/receiver, the capability determining device configured to determine functional capabilities of the AP, wherein the functional capabilities include media access control layer functionalities; and
a capability adjusting device in communication with the transmitter/receiver, the capability adjusting device configured to:
adjust the functional capabilities of the AP; and
generate an acknowledgement once it has adjusted the functional capabilities of the AP.

9. The AP according to claim 8, wherein:
the transmitter/receiver is configured to receive a functional capability inquiry message; and the capability determining device is configured to generate a response to the functional capability inquiry message, the response including a list of the functional capabilities of the AP.

10. The AP according to claim 8, further comprising:
a station management entity (SME) in communication with the capability determining device and the capability adjusting device, the SME configured to store a list of the functional capabilities of the AP.

11. The AP according to claim 10, wherein:
the capability adjusting device is further configured to:
   signal the SME to update the list of the functional capabilities of the AP; and
   generate an acknowledgement once the SME has adjusted the capabilities of the AP.

12. The AP according to claim 10, wherein:
the transmitter/receiver is configured to receive a functional capability inquiry message; and
the capability determining device is configured to:
   access the list of the functional capabilities stored in the SME; and
   generate a response to the functional capability inquiry message, the response including the list of the functional capabilities of the AP.

13. The AP according to claim 8, wherein the transmitter/receiver is further configured to:
   receive a functional capability inquiry from the AC; and
   reply to the functional capability inquiry, providing functional capabilities of the AP.

14. The AP according to claim 8, wherein the transmitter/receiver is further configured to:
   discover the AC; and
   send a functional capabilities indication to the AC.

* * * * *